United States Patent [19]
Konrad

[11] 3,964,013
[45] June 15, 1976

[54] CAVITATING PARAMETRIC UNDERWATER ACOUSTIC SOURCE
[75] Inventor: William L. Konrad, Niantic, Conn.
[73] Assignee: The United States of America as represented by the Secretary of the Navy, Washington, D.C.
[22] Filed: Oct. 22, 1974
[21] Appl. No.: 516,858

[52] U.S. Cl. ............................... 340/5 R; 340/3 A
[51] Int. Cl.² ...................... H04B 11/00; G01S 9/66
[58] Field of Search ............ 340/3 R, 5 R, 12 R, 340/3 A

[56] References Cited
UNITED STATES PATENTS
3,612,211   10/1971   Clark ........................... 340/15
3,622,958   11/1971   Tucker et al. .................. 340/3 R X
3,786,405   1/1974    Chramiec et al ................ 340/3 R
3,872,421   3/1975    Rogers et al .................... 340/10

*Primary Examiner*—Richard A. Farley
*Attorney, Agent, or Firm*—Richard S. Sciascia; Arthur A. McGill; Prithvi C. Lall

[57] ABSTRACT

A cavitating parametric underwater acoustic source for generating efficiently acoustic energy at low and medium frequencies. The source comprises a plurality of electro-acoustic transducer elements which are electrically energized in a liquid medium such as water at two or more primary frequencies. Changes in the ambient liquid pressure at or adjacent the transducer cause cavitation in the liquid medium which produces a high degree of non-linearity resulting in the generation of sum and difference frequencies of the primary frequencies in the liquid. The difference frequency is used to transmit acoustic energy efficiently in the liquid medium.

5 Claims, 4 Drawing Figures

CAVITATING PARAMETRIC UNDERWATER ACOUSTIC SOURCE

STATEMENT OF GOVERNMENT INTEREST

The invention described herein maybe manufactured and used by or for the Government of the United States of America for governmental purposes without the payment of any royalties thereon or therefore.

BACKGROUND OF THE INVENTION

This invention relates to acoustic sources for transmitting acoustic energy at low and medium frequencies and more particularly to a cavitating parametric underwater acoustic source for efficiently transmitting acoustic energy at low and medium frequencies.

Present techniques or systems for transmitting acoustic power at low and medium frequencies require large projectors usually equipped with unreliable pressure compensating devices. Furthermore, such a conventional source has very low efficiency for transmitting a wide band of low frequencies as the transducers or transducer elements used resonate at a single frequency. Non-cavitating parametric acoustic sources also have quite low efficiency to transmit acoustic power at low and medium frequencies as there is only a small amount of non-linearity resulting from changes in velocity of sound with pressure changes in the medium. Thus it is desirable to have an acoustic source which will transmit acoustic energy at low and medium frequencies with great efficiency and wherein one can use small and rugged transducers or transducer elements which can be electrically energized at high frequencies.

SUMMARY OF THE INVENTION

The objects and advantages of the present invention are accomplished by utilizing a cavitating parametric underwater acoustic source which essentially comprises one or more conventional electro-acoustic transducer elements to which electrical power is supplied simultaneously at two or more primary frequencies. The transducer elements used are relatively light and rugged which are energized at relatively high frequencies. High degree of non-linearity experienced in the liquid medium on the surface of the transducer or adjacent the transducer generates sum and difference frequencies of the primary frequencies which are transmitted at efficiencies which are several orders of magnitude greater than the efficiencies of transmission of acoustic power of non-cavitating parametric sources.

An object of this invention is to have a cavitating parametric underwater acoustic source for transmitting acoustic energy efficiently at low and medium frequencies.

Another object of this invention is to use light and rugged transducers for transmitting acoustic energy efficiently at low and medium frequencies.

Still another object of this invention is to generate new frequencies at a distance from the transducer by using focusing techniques.

Still another object of this invention is to generate new frequencies at a distance from the transducers by using two or more transducers and using focusing techniques.

Other objects, advantages, and novel features of the invention will become apparent from the following detailed description of the invention when considered in conjunction with the accompanying drawings wherein:

DESCRIPTION OF PREFERRED EMBODIMENTS

Figure 1:
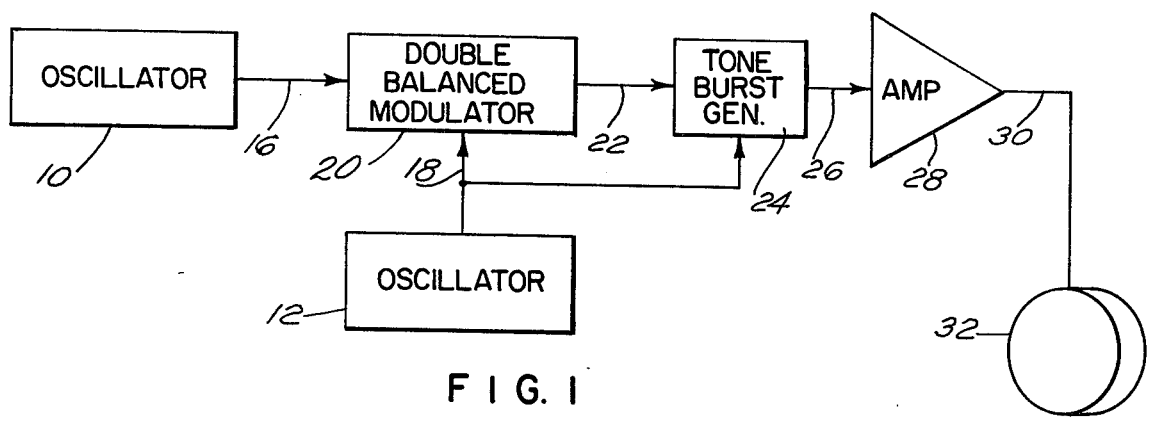
FIG. 1 is a block diagram of one embodiment of a cavitating parametric underwater acoustic source according to the teachings of this invention.

Referring to the drawings wherein like reference characters designate like parts throughout and more particularly to FIG. 1 thereof, a block diagram of a cavitating parametric underwater acoustic source according to the teachings of this invention is shown. The acoustic source includes a high frequency oscillator 10 which generates a signal of a relatively high frequency. Oscillator 10 is a conventional oscillator such as Hewlett Packard, Model 241A. A second oscillator 12 is similar to oscillator 10 which preferably generates a relatively low frequency signal. Output 16 of oscillator 10 and output 18 of oscillator 12 are fed into a double balanced modulator 20 which is a conventional modulator balanced so that its output 22 does not contain output frequencies of oscillator 10 and oscillator 12 but contains sum and difference frequencies of the output frequencies. The output 22 of modulator 20 is then fed into a tone burst generator 24 which is also energized by output 18 of the oscillator 12. Tone burst generator 24 is a conventional unit such a General Radio Model 1396A. It should be pointed out that all the units such as oscillators 10 and 12, modulator 20 and tone burst generator 24 are of conventional type and any equivalent units can be substituted without deviating from the teachings of this invention. Output 26 of tone burst generator 24 has signals of frequencies which are the sum and difference frequencies of the output frequencies of oscillator 10 and 12. Tone burst generator acts as a switch for the output of modulator 20 synchronized with output 18 of oscillator 12. The output 26 of tone burst generator 24 is amplified by a conventional power amplifier 28. The output 30 of amplifier 28 is then used to energize transducer 32 and cavitation is produced in the water at or near the face of transducer 32 which gives rise to non-linearity which increases the efficiency of generation of the difference frequency. As an illustration, the frequency of oscillator 10 was taken as 22 kilohertz, hereinafter designated as kHz, and frequency of oscillator 12 to be 500 Hz giving rise to the output 22 of modulator 20 containing frequencies of 21.5 kHz and 22.5 Khz. This gives rise to the output 30 of power amplifier 28 containing frequencies of 21.5 kHz and 22.5 kHz. Due to cavitation produced on or adjacent the face of transducer 32, the difference between the signals of 21.5 kHz and 22.5 kHz gives rise to a difference frequency of 1 kHz which is generated in the water with a greater efficiency, thus producing a capability of transmitting acoustic power at 1 kHz with great efficiency.

Figure 2:
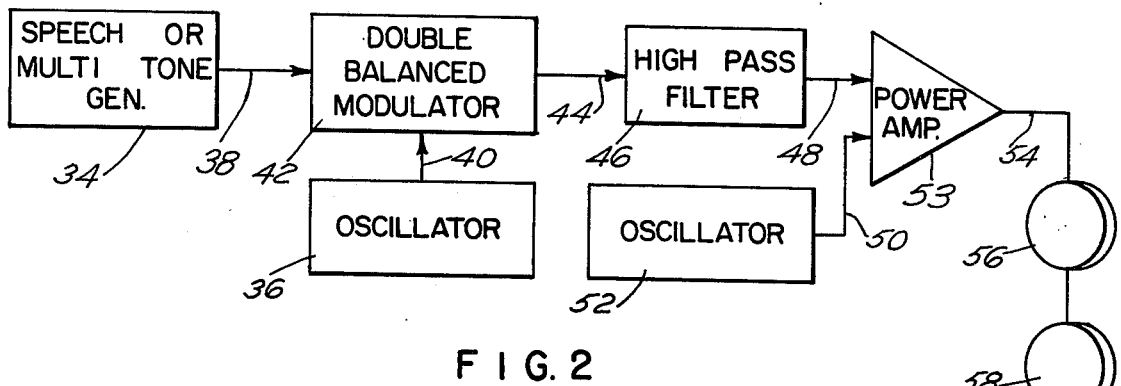
FIG. 2 is a block diagram of another embodiment for transmission of speech or multitone input.

FIG. 2 represents a block diagram of another embodiment where a speech or multitone generator 34 having an output frequency range is used in conjunction with oscillator 36 having an output frequency.

Outputs 38 and 40 of generator 34 and oscillator 36 respectively are fed into a double balanced modulator 42 which is a conventional modulator having the characteristics of eliminating the output frequencies of generator 34 and oscillator 36 respectively and gives rise to sum and difference of the output frequencies of generator 34 and oscillator 36 in the output 44 of modulator 42. Output 44 of modulator 42 is fed into a conventional high pass filter 46 which filters out the difference frequency component in the output 44 and the resulting output 48 contains the component having the sum frequency of the output frequencies of generator 34 and oscillator 36. Output 48 of high pass filter 46 and output 50 of oscillator 52 are fed into a conventional power amplifier, 53. Output 54 of conventional amplifier 53, is then used to energize a plurality of transducer elements 56, 58, and 60 which are arranged in such a way that they produce a directed beam pattern by mixing the output of these transducer elements. As an illustration, the output frequency range of speech generator 34 was taken to be between 0.5 and 2.5 kHz and the output frequency of oscillator 36 was taken at 22 kHz, giving rise to the frequencies of the signals in the output 44 of modulator 42 to be 19.5 to 21.5 and 22.5 to 24.5 kHz. High pass filter 46 filters out signals of frequencies from 19.5 kHz to 21.5 kHz leaving only signals of frequencies from 22.5 to 24.5 kHz in output 48. Frequency of output 50 of oscillator 52 was taken as 20 kHz. Thus output 54 of power amplifier 53 has signals of frequencies 20 kHz and 22.5 kHz to 24.5 kHz which are then linearly transformed into acoustical energy by transducer elements 56, 58, and 60. These signals cause cavitation adjacent or at the face of the transducer and which in turn allows the difference frequency range, i. e., frequency range between 2.5 kHz and 4.5 kHz to be generated with great efficiency.

Figure 3:
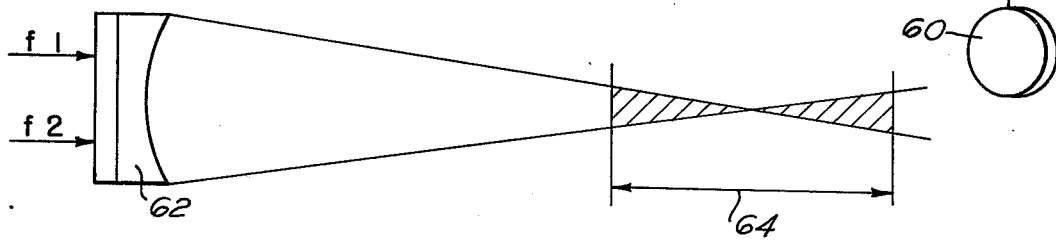
FIG. 3 is a representation of another embodiment of this invention.

FIG. 3 diagrammatically indicates another embodiment using a curved face transducer or an acoustic lense 62, made of a suitable low loss material such as polystyrene or lucite, where non-linearity is produced farther away from the transducer and as a result the low or medium frequency is now generated at a distance from the transducer.

Figure 4:
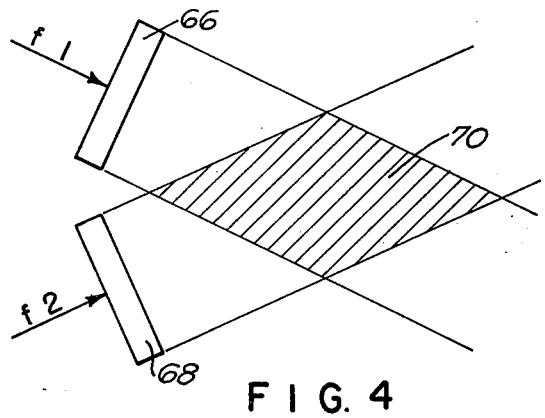
FIG. 4 a schematic representation depicting still another embodiment of this invention.

FIG. 4 likewise is a diagrammatic representation of still another embodiment wherein two different transducer elements 66 and 68 are arranged in such a way that the zone 70 of cavitation is again farther away from the transducer elements. It should be pointed out that all the electronic units used in various embodiments are conventional units such as all oscillators can be Hewlett Packard Model 241A having different ranges of frequencies and the tone burst generator can be General Radio Model 1396A or the equivent thereof. Modulators, amplifiers and transducers they are all of conventional type.

Thus a cavitating parametric underwater acoustic source for transmitting acoustic energy at low and medium frequencies comprises one or more conventional electro-acoustic transducers to which electrical power is supplied at two or more primary frequencies. Sufficient acoustic pressure is produced so that cavitation occurs in the liquid medium such as water either at the face of the transducer or at some distance from the radiating face of the transducer. The cavitation produces a high degree of non-linearity in the liquid medium which is turn is relatively efficient in the production of intermodulation products of the primary frequencies. The transmission of energy at the difference of the primary frequencies is of particular interest. It should be pointed out that the sum frequency of the primary frequencies produced can also be used along with its harmonics and can have various other applications as well.

Obviously many modifications and variations of the present invention are possible in the light of above teachings. For example, it is possible to use various substitutes for the conventional electronic units without deviating from the teaching of subject invention. Furthermore, the focusing schemes focusing be varied to obtain various zones of cavitation. Besides, the sum frequency of the primary frequencies may also be used for transmission. It is therefore understood that within the scope of the appended claims the invention may be practiced otherwise than as specifically described.

I claim:

1. A cavitating parametric underwater acoustic source for generating acoustic power efficiently in water which comprises:

a first oscillator means for generating electrical signals of a first output frequency;

a second oscillator means for generating electrical signals of a second output frequency;

a modulator means having inputs from the output of said first oscillator means and from the output of said second oscillator means and for having an output thereof with electrical signals having frequencies equal to the sum and difference of said first output frequency and said second output frequency and eliminating said first and second output frequencies in the output thereof;

a toneburst generator means having the output of said modulator means to be an input thereof and for having an output comprising electrical signals of frequencies equal to the sum and difference of said first output frequency and said second output frequency; and a transducer means for producing cavitation near the surface of said transducer means and generating electrical signals having a frequency equal to the difference of said first output frequency and said second output frequency efficiently in the water resulting from non-linearity caused by cavitation.

2. The cavitating parametric underwater acoustic source of claim 1 which further comprises a power amplifier means having an input from the output of said toneburst generator and an output for applying amplified signals to said transducer means for the energization therefor thereof, causing cavitation and transmission of said difference frequency.

3. The cavitating parametric underwater acoustic source of claim 2 wherein said transducer means includes focusing means for generating a zone cavitation at a distance therefrom.

4. The cavitating parametric underwater acoustic source of claim 3 wherein said transducer means comprises two transducers being arranged to produce a cavitation zone farther away from either of the two transducers.

5. A cavitating parametric underwater acoustic source for generating acoustic power efficiently in water which comprises:

a multi-tone generator means for generating electrical signals having a band of frequencies:

a first oscillator means for generating electrical signals of a first output frequency;

a modulator means having inputs from said multitone generator means and from first oscillator means and having an output comprising electrical signals of frequencies equal to the sum and difference of the frequencies from said multi-tone generator and said first oscillator means;

a high pass filter means having its input from said output of said modulator means and having an output with frequencies equal to the sum of the frequencies from said multi-tone generator means and said first oscillator means;

a second oscillator means for generating an electrical signal of a master carrier frequency;

power amplifier means having an input from the output of said high pass filter means and the output of said second oscillator means and having an output thereof and a plurality of transducers energized by said output of said power amplifier means for generating cavitation around said plurality of transducers and thereby efficiently generating the difference frequencies for transmission.

* * * * *